(12) United States Patent
Janke et al.

(10) Patent No.: US 8,069,196 B2
(45) Date of Patent: Nov. 29, 2011

(54) METHOD AND DEVICE FOR CREATING A STARTING VALUE FOR A PSEUDORANDOM NUMBER GENERATOR

(75) Inventors: Marcus Janke, Munich (DE); Peter Laackmann, Munich (DE)

(73) Assignee: Infineon Technologies AG (DE)

( * ) Notice: Subject to any disclaimer, the term of this patent is extended or adjusted under 35 U.S.C. 154(b) by 1197 days.

(21) Appl. No.: 11/756,294

(22) Filed: May 31, 2007

(65) Prior Publication Data

US 2008/0010331 A1  Jan. 10, 2008

(30) Foreign Application Priority Data

Jul. 4, 2006  (DE) .................... 10 2006 030 888

(51) Int. Cl.
*G06F 1/02* (2006.01)

(52) U.S. Cl. ...................................... 708/250; 708/255

(58) Field of Classification Search .................. 708/250, 708/254, 255
See application file for complete search history.

(56) References Cited

U.S. PATENT DOCUMENTS

| | | | |
|---|---|---|---|
| 4,571,556 A | 2/1986 | Gnerlich et al. | |
| 6,714,955 B2 | 3/2004 | Le Quere et al. | |
| 6,795,837 B1 * | 9/2004 | Wells | 708/3 |
| 7,496,617 B2 * | 2/2009 | Franke et al. | 708/255 |
| 2002/0128928 A1 * | 9/2002 | Sukegawa | 705/26 |
| 2003/0061250 A1 | 3/2003 | Fujita et al. | |
| 2004/0019617 A1 * | 1/2004 | Hars | 708/250 |
| 2004/0267844 A1 * | 12/2004 | Harding et al. | 708/250 |
| 2005/0004959 A1 | 1/2005 | Hars | |

* cited by examiner

*Primary Examiner* — Chuong D Ngo
(74) *Attorney, Agent, or Firm* — Dickstein Shapiro LLP

(57) ABSTRACT

Method and device for creating a starting value for a pseudorandom number generator, having a reader configured to unstably read out an output value from a memory cell and a determiner configured to determine the starting value on the basis of the output value of the memory cell.

38 Claims, 5 Drawing Sheets

US 8,069,196 B2

METHOD AND DEVICE FOR CREATING A STARTING VALUE FOR A PSEUDORANDOM NUMBER GENERATOR

CROSS-REFERENCE TO RELATED APPLICATIONS

This application claims priority from German Patent Application No. 10 2006 030 888.3, which was filed on Jul. 4, 2006, and is incorporated herein by reference in its entirety.

TECHNICAL FIELD

The present invention relates to a device and a method for creating a starting value for a pseudorandom number generator as is used in smart cards, for example.

BACKGROUND

An object which is often to be solved in security controllers is the creating of random numbers and in particular true random numbers as a true random number generator may generate them. True random number generators are also called true RNGs (RNG=random number generator). The implementation of such true RNGs is time-consuming and expensive. Therefore, pseudorandom number generators, so-called PRNGs (PRNG=pseudorandom number generator), are often used which, however, generate sequences of numbers, based on a deterministic algorithm commencing from a starting value, which are principally understandable by outsiders with knowledge of the algorithm and thus are no longer random.

The term pseudorandom numbers denotes sequences of numbers which are calculated by means of a deterministic algorithm in a pseudorandom number generator and which are therefore not random, but appear random for sufficiently short sequences. Because the calculation of random numbers is accomplished deterministically on the basis of a starting value, which is also called seed, a random sequence of numbers which is created in this manner is reproducible when a known starting value is assumed. With knowledge of the algorithm and the starting value, the resulting sequence of numbers is predictable even by outsiders.

Conventional true random number generators necessitate the existence of analog circuit elements which are, however, only reluctantly implemented in primarily digital circuits. True random numbers can be created, for instance, by means of analog elements by sampling of a noise signal, the amplitude of which is random.

More common, however, is the use of a pseudorandom number generator which does not provide an optimal random sequence of numbers but which can be implemented purely in digital technology. Yet such a pseudorandom number generator necessitates a starting value. If one wishes to avoid the fundamental possibility of recalculating, this starting value must even be unknown to the potential manufacturer. This necessitates that the starting value of the pseudorandom number generator should be created within the chip itself which, however, is only feasible on the basis of a true random number generator, so that the problem of the possibility of recalculation is not solved by the implementation of a pseudorandom number generator with a known starting value.

Because the implementation of an analog unit, as would be necessary for creating a true random sequence of numbers, on, for example, a smart card/chip card is possible only to a very limited extent or with much effort, the problem of creating a non-recalculatable random number on a smart card or another cryptographic device poses a great technical problem.

SUMMARY

According to one embodiment, a device for creating a starting value for a pseudorandom number generator may have a reading circuit configured to unstably read out an output value on a memory cell and a determining circuit configured to determining the starting value on the basis of the output value of the memory cell.

According to another embodiment, a circuit may have a memory which can be driven by an unstable signal for being read out unstably. The circuit further includes a controller with an output for the unstable signal, an input for a memory content unstably read out from the memory, and an output for a starting value. The circuit further includes a pseudorandom number generator with an input for the starting value and an output for a pseudorandom number which is based on the starting value.

According to a further embodiment, a chip may have a memory which can be driven by an unstable signal for being read out unstably, and a controller with an output for the unstable signal, an input for a memory content unstably read out from the memory, and an output for a starting value. The chip also includes a pseudorandom number generator with an input for the starting value and an output for a pseudorandom number which is based on the starting value.

BRIEF DESCRIPTION OF THE DRAWINGS

Embodiments of the present invention will be detailed subsequently referring to the appended drawings, in which.

DETAILED DESCRIPTION

It is to be understood that in the following description of the figures, same elements also have identical reference numbers in the different figures and that a repeated description is omitted.

Figure 1:
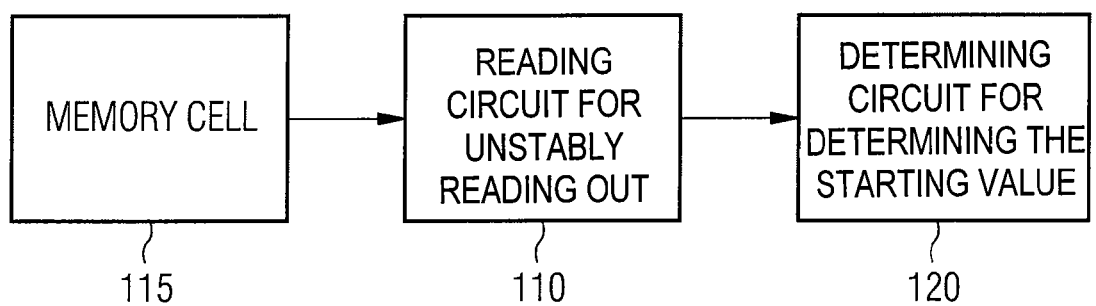
FIG. 1 shows a fundamental block diagram of a device for creating a starting value for a pseudorandom number generator according to an embodiment of the present invention.

A fundamental block diagram of an embodiment of the present invention is illustrated in FIG. 1. FIG. 1 shows a device 100 for creating a starting value for a pseudorandom number generator, comprising a reading circuit 110 for unstably reading out an output value from a memory cell 115 and with a determining circuit 120 for determining the starting value on the basis of the output value of the memory cell 115.

The embodiment of FIG. 1 comprises the advantage that the starting value for a pseudorandom number generator can be created without much effort and particularly without the necessity of analog units, for example, based on a memory content of memory cells which are deliberately read out unstably so that the read-out content corresponds to a random number, and that a random starting value for a pseudorandom number generator can be created on the basis of the random number obtained in this manner. Since this starting value is now unknown, recalculating is thus impeded considerably.

From the following description, it will be better understood how this advantage has been achieved.

Figure 2:
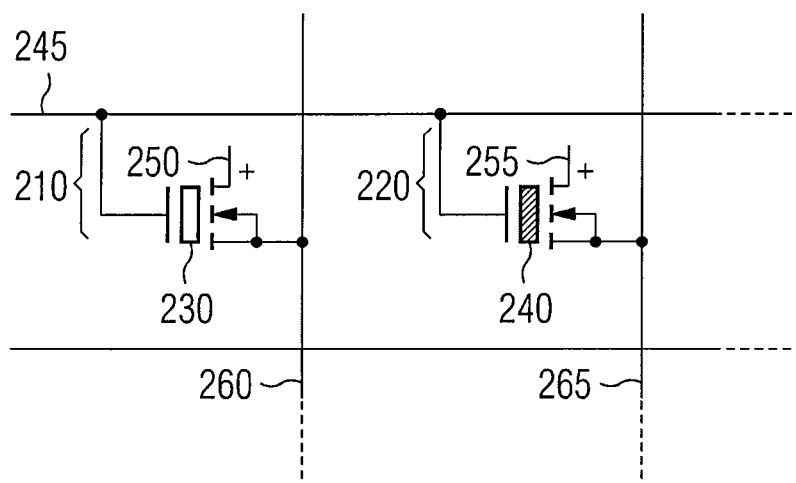
FIG. 2 shows an exemplary structure of a memory cell.

In one embodiment, the memory cell 115 is of an EEPROM (=electrical erasable programmable read-only memory), for example. This kind of memory elements is used, for instance, in connection with smart cards/chip cards. The EEPROM can be implemented in MOS technology (MOS=Metaloxidschicht=metal oxide layer). Such an EEPROM memory unit is illustrated by way of example in FIG. 2. Particularly, FIG. 2 shows, by way of example, two MOSFETs (FET=field effect transistor) 210 and 220 forming two memory cells of the EEPROMs for storing the value of a different bit, respectively. Both MOSFETs have what is called floating gates 230 and 240. A floating gate is insulated from the control gate and the channel by a metal oxide layer. A charge injection on the floating gate causes the FET to become highly resistive. This is indicated in FIG. 2 by means of the hatching of the floating gate 240. In FIG. 2 the MOSFET 220 is charged, whereas the MOSFET 210 is uncharged. Consequently, in this shown case they store different bit values. The EEPROM memory cells may be cleared by a high voltage pulse between a line 245 and the line 260 and 265, respectively, which places the charge of the barrier layer in the original stage, the line 245 being connected to electrodes which are arranged close to the floating gates.

For example, the EEPROM in FIG. 2 is provided with a read amplifier (not shown). This read amplifier is substantially a type of comparator which compares the signal, namely voltage or current, from the field of the cell, namely the current or the voltage present across the respective MOSFET, with a read reference. If the read reference is exceeded, the memory within the cell has to be evaluated as state or bit value A, and if it is not, as state B. For example, with reference to FIG. 2, a current would flow through the MOSFET 210 upon application of a voltage difference between a pair of lines 250 and 260 which are connected to the source or the drain of the MOSFET 210, whereas this would not be the case upon application of a voltage difference between a pair of lines 255 and 265 which are connected to the source or the drain of the MOSFET 220. The current signals are supplied to the read amplifier or comparator which then, by way of comparison with a read reference, allocates the corresponding memory cell states to the currents. This implies that the read reference is of major importance for the evaluation of the information. During normal operation of a memory cell, the aim here is to select the read reference such that even aged cells, in which the amount of charge caused by the charge injection on the floating gate is lower, still create a defined state. The EEPROM of FIG. 2 now offers the possibility of varying the read references such that the cell information is evaluated with "stricter" read references, and the read amplifier performs an "unstable reading out" to serve as the reading circuit 110 in the sense that the read amplifier, with a read reference that has changed increasingly with respect to the normal state, by mistake, allocates cells comprising a certain bit value to the other bit value. As is described in what follows, the determining circuit 120 utilizes the variability of the read reference such that it is just within an unstable range, i.e., some cells that contain the state A are read out as A, and other cells which contain the state A are interpreted as B, in order to determine a starting value from the unstably read-out states. According to subsequently described embodiments, the suitable read reference is determined by iteratively varying the read reference and ensuring that the unstable state is achieved as well as possible.

Figure 3:
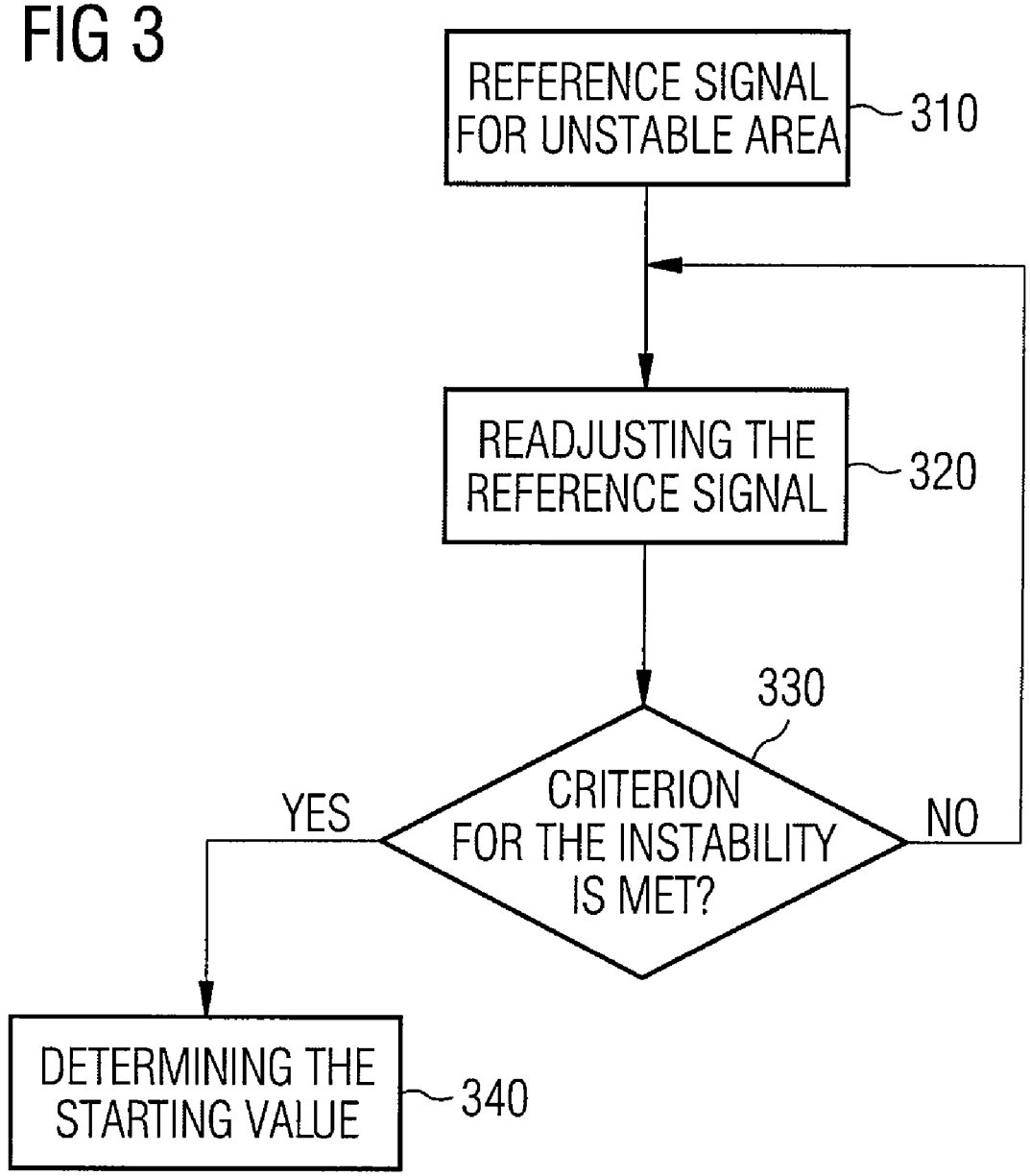
FIG. 3 shows a flow chart of an embodiment of a method.

The process of such an iterative approximation is illustrated in FIG. 3 in a flow chart. On the basis of a reference signal for a stable range or for a stable reading out 310, the reference signal is re-adjusted by the determining circuit 120 in a step 320, and a criterion that illustrates a measure of the achieved instability of the memory cell 115 is checked in a step 330. It would, for example, be possible to periodically read out a certain memory area from multiple memory cells, while the read reference for said memory area is varied iteratively. For example, a criterion for the achieved instability would then be, or, rather, the object of the iteration would be achieved, when at least half of the information is read out correctly and the other half is read out incorrectly, wherein, for example, all the memory cells of the memory area were previously initialized to a predetermined known bit value. The starting value is then determined in step 340 using this reference value according to FIG. 3, that is on the basis of the unstably read out cell states achieved with the iteratively determined reference value. The starting value for the pseudorandom number generator may directly correspond to the unstably read-out cell states, or may then be achieved from said read-out bits, for example, by means of formation of the Hamming weight, by means of Hash algorithms or also by means of compressing or selecting functions. Compressing functions, for instance, map a number of read-out memory cell contents or bits to a corresponding lower number of memory cell contents or bits. Selecting functions, for example, select a number of digits from a correspondingly read-out data word to form a new data word therefrom.

In a further embodiment, as an alternative to adjusting the read reference, the cell voltage across the line pairs 250/260 and 255/265, respectively, which can be generated via pumps, or the cell current may be varied, and thus the memory cells may be read out in an unstable state. This is also possible in UCP memories (UCP=uniform channel programming), for example. UCP memories are also frequently used in smart cards/chip cards. Additionally, a UCP memory may allow an iterative variation of a read reference such that an unstable read-out state is achievable, alternatively or additionally to the cell voltage variation, by the variation of the read reference. Additionally, the UCP memory may have what is called a disturb counter, via which cell areas may be identified which have already become more unstable due to programmings in the vicinity, which may be used by the determining circuit 120 to preselect older cells which may be used for creating a starting value.

In a further embodiment of the present invention, a program which runs on smart cards/chip cards may initially search an EEPROM memory area in which the disturb counter contains a high value, and may then iteratively vary the read reference when periodically reading out said area, as illustrated in FIG. 3 by way of example.

Figure 4:
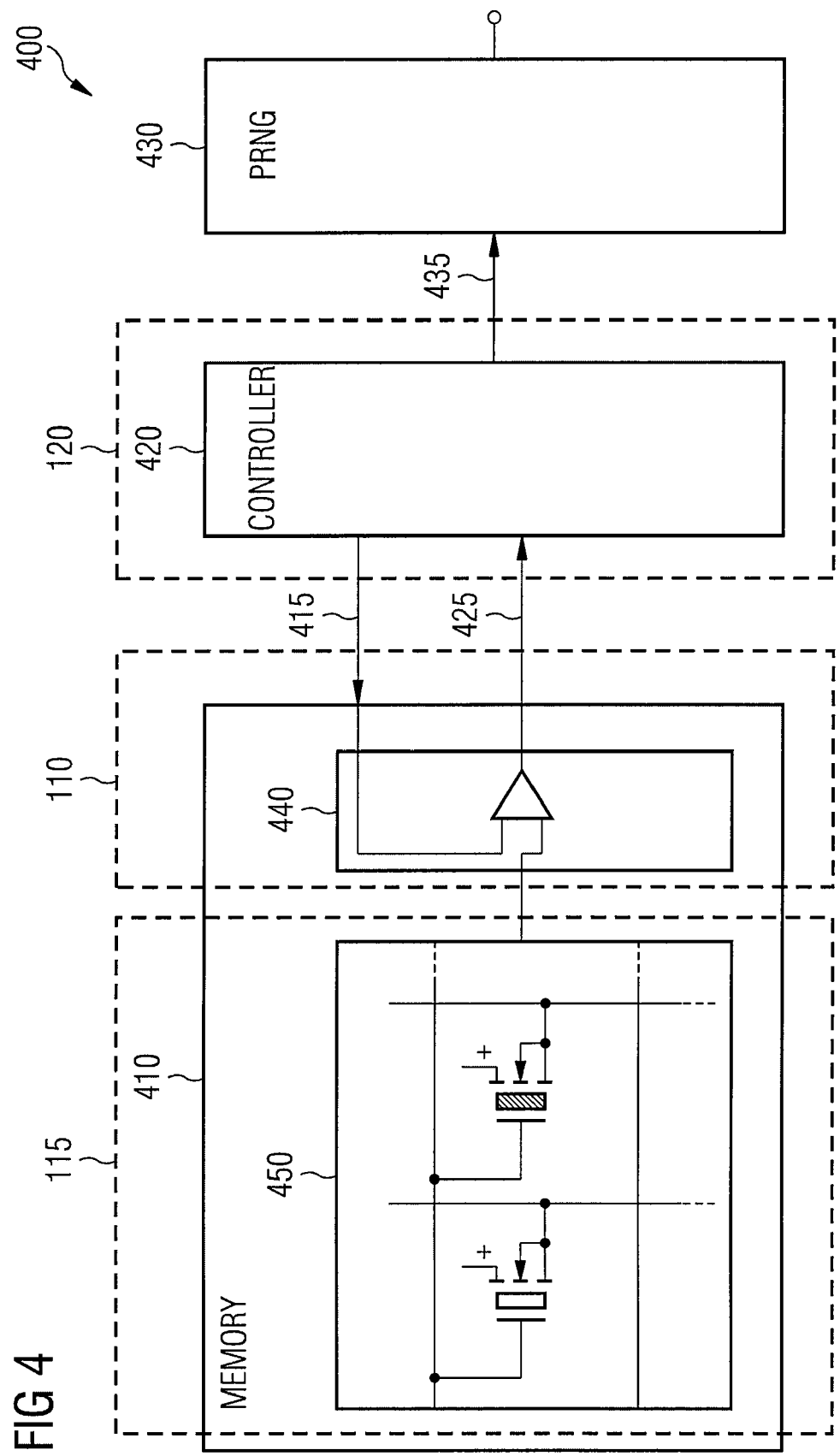
FIG. 4 shows an embodiment of a circuit.

FIG. 4 shows a further embodiment of the present invention. FIG. 4 shows a circuit 400 with a memory 410 which may be driven by an 'unstable' signal 415 for being read out unstably. The circuit further comprises a controller 420 with an output for the 'unstable' signal 415, an input for a memory content 425 unstably read out from the memory, and an output for a starting value. The circuit 400 further comprises a pseudorandom number generator 430 with an input 435 for the starting value and an output for a pseudorandom number which is based on the starting value. The memory 410 illustrated in FIG. 4 further comprises a read amplifier 440 and memory cells 450. The memory cells 450 are, for example, EEPROM memory cells as were explained in FIG. 2 by way of example. In the embodiment illustrated in FIG. 4, the read amplifier 440 comprises an implication that the read reference of a comparator is adjusted on the basis of the 'unstable' signal 415. The controller 420 could therefore perform an iterative adjusting algorithm such as is illustrated and explained, by way of example, in the flow chart in FIG. 3. FIG. 4 implies by means of broken lines that according to the embodiment of FIG. 4 the read amplifier serves as the reading circuit 110 for unstably reading out an output value, and the controller 420 serves as the determining circuit 120 for determining the starting value on the basis of the output value of the memory cell 115.

Figure 5:
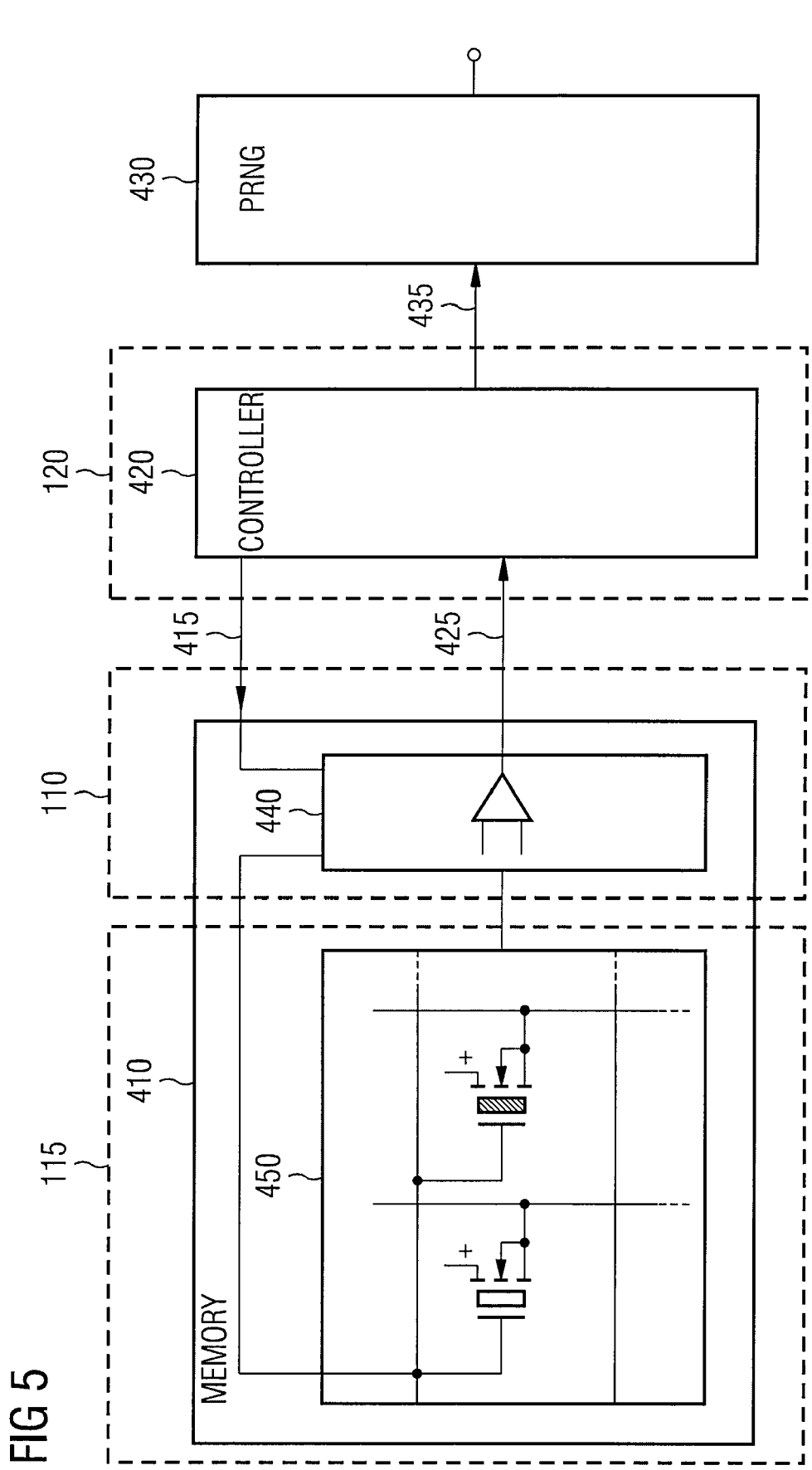
FIG. 5 shows a further embodiment of a circuit.

FIG. 5 shows a further embodiment of the present invention. In FIG. 5 the same components are illustrated which have already been explained for FIG. 4, only the connectivity within the memory 410 is different and is to imply that in this embodiment the supply signal, that is the cell voltage or the cell current, is adjusted via the 'unstable signal' 415 to drive the unstable area of the memory cells 450. As was already explained with respect to FIG. 4, the controller 420 can now, via an iterative approximation process according to FIG. 3, drive an unstable range or rather perform an unstable reading out of the output values of the memory cells 450. As has already been said, a combination of the embodiments of FIG. 4 and FIG. 5 would also be possible, of course.

Figure 6:
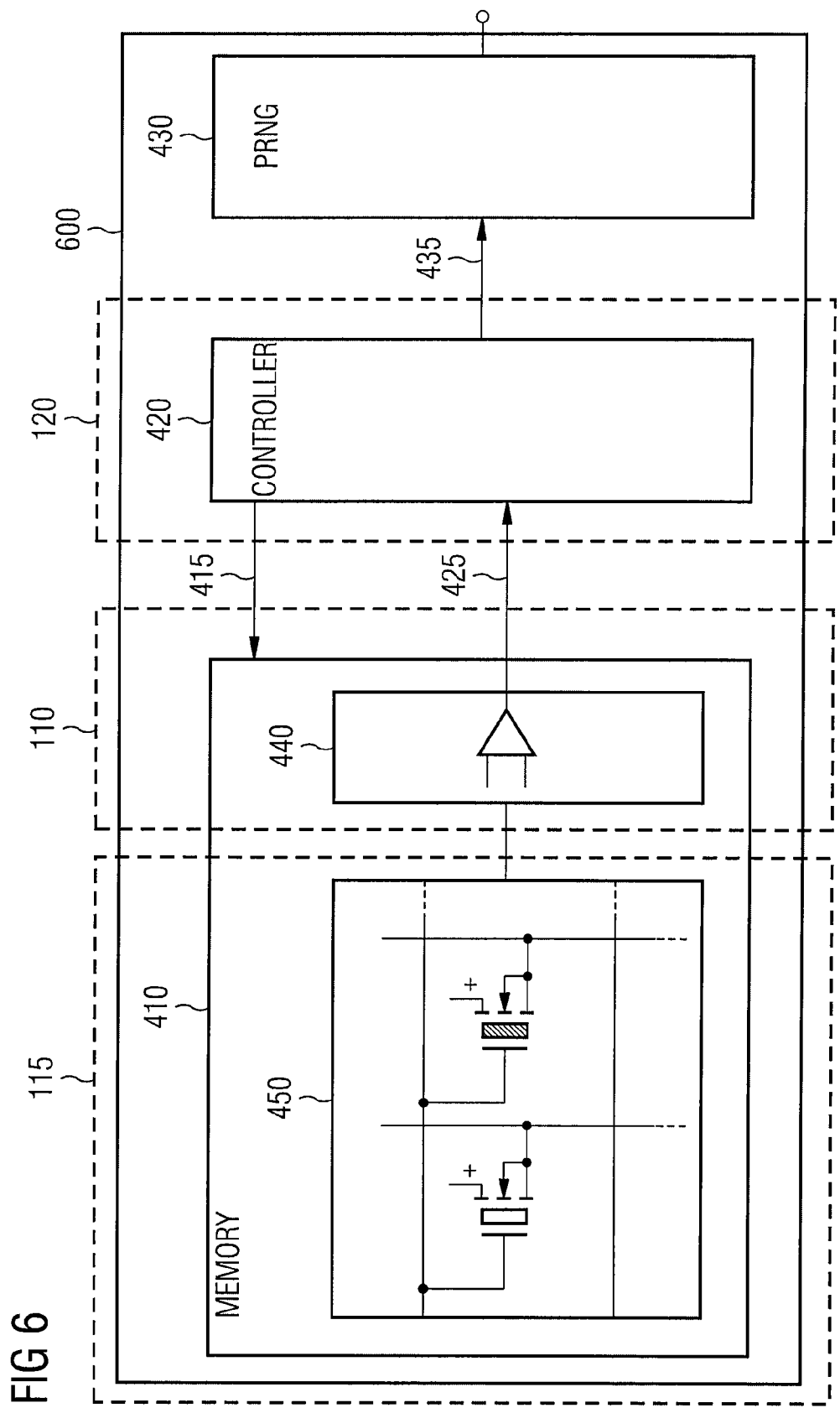
FIG. 6 shows an embodiment of a chip.

FIG. 6 illustrates a further embodiment of the present invention. FIG. 6 shows a chip 600 on which the components already explained in FIGS. 4 and 5 are implemented or integrated. The chip 600 comprises a memory 410, with a read amplifier 440 and memory cells 450, which may be driven by an 'unstable' signal 415 for being read out stably. The chip 600 further comprises a controller 420 with an output for the 'unstable' signal 415, an input for memory content unstably read out from the memory 410, and an output for a starting value. The chip further comprises a pseudorandom number generator 430 with an input 435 for the starting value and an output for a pseudorandom number which is based on the starting value. Additionally, FIG. 6 once again shows, by means of broken lines, the reading circuit 110 for unstably reading out an output value from a memory cell 115 and the determining circuit 120 for determining the starting value on the basis of the output value of the memory cell 115.

An advantage of embodiments of the present invention is the fact that, on the one hand, the starting value may be stored in the NVM for future use and, on the other hand, the method can nevertheless be performed again at any time. This results in diverse possibilities. For example, the starting value may be generated once during production for being stored in an NVM memory for future use, alternatively, the starting value could be created again and again in the described manner, upon restarting the chip or the circuit. In another embodiment, the starting value would be created once, stored in the NVM memory, and used accordingly upon invoking the pseudorandom number generator. An output value of the pseudorandom number generator could then be stored at the location of the starting value in an additional or in the same memory in the circuit or on the chip, so that another starting value is available for the next invokation of the pseudorandom number generator or for the next restart of the circuit or the chip.

Since NVM memories are subjected to aging processes, a further advantage of embodiments of the present invention is a very low loading for the NVM memory which otherwise would permanently have to store new starting values or intermediate values. The example of use of the one-time determining of the starting value and storing of the starting value in an NVM memory for future use therefore has the advantage that by means of the described method and the described circuit, device or chip, respectively, aging processes of the NVM memory due to generating starting values will not occur because the generation takes place only once and thus involves only one write cycle.

A further advantage of the example of use of the present invention is that in most cases NVM memories comprise only a limited number of write cycles and the method described herein generates a starting value by reading out, i.e., by generating the starting value, no wear of the NVM memory occurs, as is the case with writing.

In embodiments of the present invention, a starting value for a pseudorandom number generator is created by a device or a method making use of an unstable reading out of an NVM memory by temporarily changing the read reference or the cell voltage/current. The effect described is employed in a controlled manner, and the data which is read is converted to a starting value for a pseudorandom number generator either directly, via a Hamming weight/distance, via Hash algorithms or via compressing or selecting functions. Additional advantages of present embodiments result from the fact that conventional security controllers are equipped with a CPU (=central processing unit) as well as diverse peripheral modules, amongst them also NVM modules (EEPROM/flash). Since no true random number generators exist, embodiments of the present invention provide the possibility of generating a starting value for a pseudorandom number generator which is unknown to the manufacturer. Alternatively, when starting a program, or as a one-time action during production, the NVM memory may now be read out with an embodiment of an inventive method, it being possible to iteratively change a read reference or a cell voltage/current while a memory area is read out periodically. A disturb counter may be used as an indication of a suitable memory area and, by optional reworking, for example, by means of Hash algorithms, by means of compressing or selecting functions or by determining Hamming weights or Hamming distances between different memory areas, starting values which are unknown to the manufacturer may be generated for pseudorandom number generators.

Embodiments of the present invention may be integrated into smart cards/chip cards and may, generally, solve the problem of recalculatability of pseudorandom sequences of numbers. Security controllers are equipped with a CPU as well as with diverse peripheral modules, amongst others also with an NVM module (EEPROM/flash). In many fields of application, this provides the possibility of reading out the NVM module with the described method when starting a program or once during production, i.e., for example, to iteratively ascertain an unstable read state so as to subsequently generate a starting value for a pseudorandom number generator.

Basically, all feasible memory types may be used in embodiments. Besides NVM memories, for example, RAM memories (RAM=random access memory) are conceivable, in which an unstable reading out may be accomplished, for example, by increasing the refresh cycle or by reading out with a longer interval from the latest refresh date. Furthermore, a one-time programmable ROM (=read only memory) may be included in embodiments for storing the starting value, it being possible to perform the programming during the fabrication, for instance. Alternatively, a memory may be provided, or rather, the same memory which is used for creating the starting value may serve to store or latch the starting value, in case a starting value is generated again at a later time, for instance, upon the next power up. Further, the embodiments quoted herein are not limited to smart cards/chip cards and may generally be employed in all applications which create starting values for pseudorandom number generators and in which corresponding memory units exist.

In particular, it is to be understood that, depending on the circumstances, the inventive scheme may also be implemented in software. The implementation may be on a digital memory medium, in particular on a disc or a CD having control signals which may be read out electronically and which may cooperate with a programmable computer system and/or a microcontroller such that the corresponding method will be executed. Generally, the invention thus also consists in a computer program product having a program code, stored on a machine-readable carrier, for performing the inventive method, when the computer program product runs on a computer and/or a microcontroller. Put differently, the invention may thus also be realized as a computer program having a program code for performing the method, when the computer program runs on a computer and/or microcontroller.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A device for creating a starting value for a pseudorandom number generator, comprising:
    a reading circuit configured to unstably read out an output value from a memory cell; and
    a determining circuit configured to determine the starting value on the basis of the output value of the memory cell,
    wherein the reading circuit is configured to unstably read out a respective output value from a plurality of memory cells, each containing a respective actual binary state, such that some memory cells are read out as if same contained the respective actual binary state as the respective output value, and some memory cells are read out as if same contained an opposite binary state as the respective output value, the determining circuit being configured to determine the starting value based on the output values of the plurality of memory cells.

2. The device according to claim 1, wherein the reading circuit comprises memory cells which may be driven via a cell current or a cell voltage such that the contents of the memory cells may be read out unstably.

3. The device according to claim 2, wherein the plurality of memory cells are NVM memory cells.

4. The device according to claim 1, wherein the reading circuit comprises a read amplifier which determines the output value, the output value being based on a comparison between a memory cell signal, which is based on a memory cell content, and a read reference, and the read reference being adjustable such that the output value may either be read out equally or complementary to the memory cell content.

5. The device according to claim 1, wherein the reading circuit comprises an NVM memory (NVM=non-volatile memory).

6. The device according to claim 5, wherein the NVM memory further comprises a counter with a count, which is a measure of a stability of a memory cell.

7. The device according to claim 1, wherein the reading circuit comprises an EEPROM memory (EEPROM=electrical erasable programmable read-only memory).

8. The device according to claim 1, wherein the determining circuit comprises a circuit configured to determine a Hamming weight, a circuit configured to determine a Hamming distance, or a circuit configured to effect a compressing or selecting function.

9. The device according to claim 1, wherein the reading circuit may be driven to determine a read-out value by unstable reading out, and the determining circuit may be driven to determine the starting value, and the device further comprises a one-time programmable memory circuit configured to store the starting value or a value which is based on the starting value.

10. The device according to claim 1, wherein the reading circuit and the determining circuit may be activated by a restart of the device, and the device further comprises a memory circuit in which the starting value or a value which is based on the starting value may be stored.

11. The device according to claim 1 which is integrated into a chip.

12. The device according to claim 1, wherein the reading circuit is configured to read out the output values from the plurality of memory cells in an unstable manner by closed loop controlling a read reference or a cell voltage or current with using an instability measure being maximal if 50% of the memory cells are read out as if same contained the respective actual binary state, and 50% of the memory cells are read out as if same contained the opposite binary state.

13. A circuit comprising:
    a memory which may be driven by an unstable signal to be read out unstably;
    a controller with an output for the unstable signal, an input for a memory content which is read out unstably from the memory, and an output for a starting value; and
    a pseudorandom number generator comprising an input for the starting value and an output for a pseudorandom number which is based on the starting value,
    wherein the memory comprises a plurality of memory cells with each containing a respective actual binary state, and the controller and the memory are configured such that the unstable read out results in the memory content of some memory cells at the input of the controller equaling the respective actual binary state, and the memory content of some memory cells at the input of the controller equaling an opposite binary state, the controller being configured to determine the starting value based on the memory contents of the plurality of memory cells at the input of the controller.

14. The circuit according to claim 13, wherein in the memory a cell voltage or a cell current may be driven via the unstable signal.

15. The circuit according to claim 13, wherein in the memory a read reference may be driven by the unstable signal.

16. The circuit according to claim 13, further comprising a memory for storing the starting value or a value which is based on the starting value.

17. The circuit according to claim 13, wherein the memory comprises an NVM memory or an EEPROM.

18. The circuit according to claim 13, wherein the controller is configured to closed loop control a read reference or a cell voltage or current of the memory with using an instability measure being maximal if 50% of the memory content is read out correctly, and 50% of the memory content is read out oppositely to an actually stored version of the memory content.

19. The circuit according to claim 13, wherein the plurality of memory cells are NVM memory cells.

20. A chip comprising:
    a memory which may be driven by an unstable signal to be read out unstably;
    a controller with an output for the unstable signal, an input for a memory content which is read out unstably from the memory, and an output for a starting value; and
    a pseudorandom number generator with an input for the starting value and an output for a pseudorandom number which is based on the starting value, wherein the memory comprises a plurality of memory cells with each containing a respective actual binary state, and the controller and the memory are configured such that the unstable read out results in the memory content of some memory cells at the input of the controller equaling the respective actual binary state, and the memory content of some memory cells at the input of the controller equaling an opposite binary state, the controller being configured to determine the starting value based on the memory contents of the plurality of memory cells at the input of the controller.

21. The chip according to claim 20, wherein in the memory a cell voltage or a cell current may be driven by the unstable signal.

22. The chip according to claim 20, wherein in the memory a read reference may be driven by the unstable signal.

23. The chip according to claim 20, further comprising a memory for storing the starting value or a value which is based on the starting value.

24. The chip according to claim 20, wherein the memory comprises an NVM memory, an EEPROM or a flash EEPROM.

25. The chip according to claim 20, wherein the controller is configured to closed loop control a read reference or a cell voltage or current of the memory with using an instability measure being maximal if 50% of the memory content is read out correctly, and 50% of the memory content is read out oppositely to an actually stored version of the memory content.

26. The chip according to claim 20, wherein the plurality of memory cells are NVM memory cells.

27. A method for creating a starting value for a pseudorandom number generator, the method comprising:
  unstably reading out an output value from a memory cell; and
  determining the starting value on the basis of the output value of the memory cell,
  wherein the unstable reading comprises unstably reading out a respective output value from a plurality of memory cells, each containing a respective actual binary state, such that some memory cells are read out as if same contained the respective actual binary state as the respective output value, and some memory cells are read out as if same contained an opposite binary state as the respective output value, the determining the starting value being performed using the output values of the plurality of memory cells.

28. The method according to claim 27, further comprising:
  iteratively tracking a cell voltage or a cell current; and
  checking the instability of the reading out.

29. The method according to claim 27, further comprising effecting a computing operation based on the unstably read-out starting value for determining the starting value.

30. The method according to claim 27, wherein the step of determining includes calculating a Hamming weight, a Hamming distance or applying a compressing or a selecting function.

31. The device according to claim 27, further comprising closed loop controlling a read reference or a cell voltage or current of the plurality of memory cells with using an instability measure being maximal if 50% of the memory cells are read out as if same contained the respective actual binary state, and 50% of the memory cells are read out as if same contained the opposite binary state.

32. A method for creating a pseudorandom number, comprising:
  unstably reading out an output value from a memory cell;
  determining a starting value on the basis of the output value of the memory cell; and
  generating the pseudorandom number on the basis of the starting value,
  wherein the unstable reading comprises unstably reading out a respective output value from a plurality of memory cells, each containing a respective actual binary state, such that some memory cells are read out as if same contained the respective actual binary state as the respective output value, and some memory cells are read out as if same contained an opposite binary state as the respective output value, the determining the starting value being performed using the output values of the plurality of memory cells.

33. The method according to claim 32, further comprising:
  iteratively tracking a cell voltage, a cell current or a read reference; and
  checking the instability of the reading out.

34. The method according to claim 32, further comprising a calculating the starting value on the basis of the unstably read-out starting value.

35. The method according to claim 32, wherein the step of determining includes calculating a Hamming weight, a Hamming distance or applying a compressing or selecting function.

36. The device according to claim 32, further comprising closed loop controlling a read reference or a cell voltage or current of the plurality of memory cells with using an instability measure being maximal if 50% of the memory cells are read out as if same contained the respective actual binary state, and 50% of the memory cells are read out as if same contained the opposite binary state.

37. A non-transitory computer readable medium having stored thereon a computer program comprising a program code for creating a starting value for a pseudorandom number generator by unstably reading out an output value from a memory cell, and determining the starting value on the basis of the output value of the memory cell, wherein the unstable reading comprises unstably reading out a respective output value from a plurality of memory cells, each containing a respective actual binary state, such that some memory cells are read out as if same contained the respective actual binary state as the respective output value, and some memory cells are read out as if same contained an opposite binary state as the respective output value, the determining the starting value being performed using the output values of the plurality of memory cells.

38. A device for creating a starting value for a pseudorandom number generator, comprising:
  reader means for unstably reading out an output value from a memory cell; and
  determining means for determining the starting value on the basis of the output value of the memory cell,
  wherein the reader means is configured to unstably read out a respective output value from a plurality of memory cells, each containing a respective actual binary state, such that some memory cells are read out as if same contained the respective actual binary state as the respective output value, and some memory cells are read out as if same contained an opposite binary state as the respective output value, the determining means being configured to determine the starting value based on the output values of the plurality of memory cells.

* * * * *